(12) United States Patent
Huisken et al.

(10) Patent No.: US 10,678,042 B2
(45) Date of Patent: Jun. 9, 2020

(54) IMAGING METHOD USING MAGNETIC ELEMENTS AND DEVICE FOR THIS PURPOSE

(71) Applicant: Wisconsin Alumni Research Foundation, Madison, WI (US)

(72) Inventors: Jan Huisken, Dresden (DE); Gopi Shah, Dresden (DE)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/557,848

(22) PCT Filed: Apr. 1, 2016

(86) PCT No.: PCT/EP2016/057186
§ 371 (c)(1),
(2) Date: Sep. 13, 2017

(87) PCT Pub. No.: WO2016/162274
PCT Pub. Date: Oct. 13, 2016

(65) Prior Publication Data
US 2018/0052315 A1 Feb. 22, 2018

(30) Foreign Application Priority Data
Apr. 10, 2015 (EP) .................................. 15163243

(51) Int. Cl.
*G01N 21/64* (2006.01)
*G02B 21/36* (2006.01)
(Continued)

(52) U.S. Cl.
CPC ........ *G02B 21/367* (2013.01); *F16C 32/0406* (2013.01); *G01N 21/01* (2013.01); *G02B 21/32* (2013.01)

(58) Field of Classification Search
CPC ....... G01N 33/54326; G01N 33/54373; G01N 21/6428; G01N 2201/062;
(Continued)

(56) References Cited

U.S. PATENT DOCUMENTS 8,482,854 B2 * 7/2013 Lippert .................. G02B 21/33
359/381
2003/0166262 A1 9/2003 Strick et al.
(Continued)

OTHER PUBLICATIONS

Craig et al., "An optimized method for delivering flow tracer particles to intravital fluid environments in the developing zebrafish," 2012, Zebrafish, vol. 9, No. 3, pp. 108-119. (Year: 2012).*
(Continued)

*Primary Examiner* — Kiho Kim
(74) *Attorney, Agent, or Firm* — Boyle Fredrickson S.C.

(57) ABSTRACT

Method for imaging regions of a sample using a light source and an optical detection means and at least one device for moving the sample in three dimensions, comprising the following method steps: a) introducing at least one magnetic element into the sample, b) applying a magnetic field by means of the at least one device for moving the sample in three dimensions, the magnetic field interacting with the at least one magnetic element introduced into the sample, c) arranging the region of the sample in a radiation region of the light source and in a detection region of the detection means, d) emitting first light beams from the light source onto the sample, e) generating second light beams by means of the sample, f) recording an image of a region of the sample by capturing a proportion, incident on the detection means from the sample, of the second light beams, g) moving the at least one magnetic element and the sample containing this at least one magnetic element by varying the magnetic field, h) repeating steps d) to g) until a predeterminable number of images have been recorded.

18 Claims, 3 Drawing Sheets

(51) Int. Cl.
   *G02B 21/32* (2006.01)
   *F16C 32/04* (2006.01)
   *G01N 21/01* (2006.01)
(58) Field of Classification Search
   CPC .......... G01N 2021/6439; G01N 21/01; G01R 33/1276; G02B 21/32; G02B 21/367
   See application file for complete search history.

(56) References Cited

U.S. PATENT DOCUMENTS

| | | | | |
|---|---|---|---|---|
| 2008/0067068 | A1* | 3/2008 | Li | B03C 5/005 204/451 |
| 2008/0305481 | A1* | 12/2008 | Whitman | C12Q 1/6818 435/6.12 |
| 2010/0177381 | A1* | 7/2010 | Lippert | G02B 21/26 359/398 |
| 2010/0284016 | A1 | 11/2010 | Teitell et al. | |
| 2013/0097869 | A1 | 4/2013 | Wang et al. | |
| 2013/0337034 | A1* | 12/2013 | Kosel | A61K 41/0052 424/443 |
| 2016/0209406 | A1* | 7/2016 | Aojula | B01L 3/502 |

OTHER PUBLICATIONS

Piccinetti et al., "Transfer of silica-coated magnetic (Fe3O4) nanoparticles through food: a molecular and morphological study in Zebrafish", 2014 Zebrafish, vol. 00, No. 00, pp. 1-13. (Year: 2014).*
Bambardekar et al.: "Direct laser manipulation reveals the mechanics of cell contacts in vivo." Proceedings of the National Academy of Sciences 112, No. 5 (2015): pp. 14161421. France.
Gosse et al.; "Magnetic tweezers: micromanipulation and force measurement at the molecular level." Biophysical journal 82, No. 6 (2002): pp. 3314-3329. France.

* cited by examiner

IMAGING METHOD USING MAGNETIC ELEMENTS AND DEVICE FOR THIS PURPOSE

The present invention relates to a method for imaging regions of a sample using a light source and a detection means and at least one device for moving and positioning the sample in three dimensions. The invention further relates to a device for imaging or imaging device for regions of a sample, which device comprises a light source, a detection means and a device for moving and positioning the sample in three dimensions.

Light microscopes have long been known. In early microscopy, a distinction was merely made between bright-field and dark-field microscopy or transmitted-light and incident-light microscopy. In the 20th century, additional techniques have been established by way of phase contrast, interference contrast, fluorescence, polarisation and confocal microscopes. Only in the early 21st century were these techniques supplemented with selective plane illumination microscopy (SPIM, or light sheet fluorescence microscopy). This method offers excellent imaging properties of fluorescing or fluorescent objects, for example in an embryo. This method has become established for imaging in living organisms in particular. An advantage is that merely an extremely narrow region of the sample is irradiated, and light-induced stress in biological samples is thus reduced. Thus, fluorescence analyses on living organisms and even long-term observations of embryonic development in model organisms are possible.

The term "light" is understood to mean the portion of electromagnetic radiation visible to the (human) eye, which is in the wavelength range of approximately 380 nm to approximately 780 nm.

Selective Plane Illumination Microscopy (SPIM) is a very successful technique for high-speed, long-term fluorescence imaging of living samples. In SPIM, a thin sheet of light illuminates the sample and the fluorescence is collected by a fast camera. Unlike conventional microscopes, SPIM comprises a separate illumination and a detection arm arranged orthogonal to each other. In SPIM, like in most microscopies, image quality is always best in areas that are well illuminated, i.e. facing the illumination lens, and at the same time are not too deep inside the sample, i.e. facing the detection lens. In order to image an entire sample with even quality it is therefore necessary to image such a sample from different directions and computationally merge the data. This is generally true for most optical imaging techniques that suffer from any scattering, refraction, absorption, etc. inside the sample. SPIM offers the unique ability to rotate the sample about one axis and acquire images from many angles. This rotational axis is usually vertical to minimize distortions of the sample during rotation due to gravity. However, since the top and bottom of the sample (the "poles") when rotation about a vertical axis is performed never faces the illumination or detection objective, these poles are usually poorly resolved. In order to obtain a complete picture of the sample, it is therefore desirable to have at least two axes of rotation, which would allow free positioning of any part of the sample in front of any of the lenses. This, however, is difficult to realize in the limited space that is available in between the objective lenses. Multi-view imaging is ideally performed with imaging modalities that are fast enough that the (living) sample has not changed in-between recordings. Light sheet microscopy is a particularly fast fluorescence microscopy technique and is therefore ideally suited for multi-view imaging. Typically a stack of images is recorded at each angle providing a full three-dimensional volume of data that preferentially overlap with the data recorded from other angles.

The object of the present invention is therefore to provide a method and a device by means of which substantially any orientation of the sample, and thus recording of the sample from many possible perspectives, are possible in various imaging methods. This object is achieved by a method according to claim 1 and by a device according to claim 10.

An essential aspect of the invention is a method for imaging regions of a sample using a light source and an optical detection means and at least one device for moving the sample in three dimensions, comprising the following method steps:

a) introducing at least one magnetic element into the sample,
b) applying a magnetic field by means of the at least one device for moving the sample in three dimensions, the magnetic field interacting with the at least one magnetic element introduced into the sample,
c) arranging the region of the sample in a radiation region of the light source and in a detection region of the detection means,
d) emitting first light beams from the light source onto the sample,
e) generating second light beams by means of the sample,
f) recording an image of a region of the sample by capturing a proportion, incident on the detection means from the sample, of the second light beams,
g) moving the at least one magnetic element and the sample containing this at least one magnetic element by varying the magnetic field,
h) repeating steps d) to g) until a predeterminable number of images have been recorded.

The "first" and "second" light beams may differ from one another for example in wavelength, frequency, intensity and direction.

There has been devised a novel sample manipulation technique that uses magnetic elements, preferably in form of magnetic beads, to orient the sample in the presence of a magnetic field, enabling the user to choose axis, direction and extent of rotation. This, when combined with SPIM, is a very powerful tool to acquire a holistic view of the sample. The images acquired can be fused with the established techniques of multi-view reconstruction, now with more views from otherwise inaccessible angles and a better overall resolution. The invention is not exclusive to SPIM but can also be used in other imaging techniques such as widefield and confocal fluorescence microscopy. It may even be used in tomographic techniques to rotate the sample necessary for the reconstructions such as OPT (Optical Projection Tomography). However, it may even be used in any device which does not use any magnetic properties of the probe for other kinds of manipulation of the probe or imaging the probe (e.g. magnetic resonance imaging).

The sample manipulation technique according to this invention is easily adaptable to any optical device. However, it is especially adaptable to a (SPIM-) microscope. Preferably the system comprises a feedback system with camera and image analysis system. The invention may be particularly useful in high-throughput application where many samples need to be precisely aligned in a particular orientation. The use of magnetic particles will be demonstrated in zebrafish embryos at various stages of development by the present figures.

It is advantageous if the movement in step g) comprises rotating the sample about an axis, the direction of the axis being changed at least once before the predeterminable number of images have been recorded. In other words, the movement in step g) advantageously comprises rotating the sample about at least two different axes before the predeterminable number of images have been recorded. By this it could be ensured, that the regions of the probe in vicinity to probe ends located on the first axes ("poles" of the probe (on first axis)), are not the same regions as the regions of the probe in vicinity to probe ends located on the second axes ("poles" of the probe on second axis).

In particular for SPIM, this has the advantage that in each case the sample is not merely rotated about a fixed axis. For example, the sample is first rotated merely about an axis arranged perpendicular to the direction of the first light beams as well as to the direction of the second light beams, to record first images. It should be noted that in SPIM this axis is usually arranged vertically, since the first, irradiated light beams and the second, reflected light beams are usually arranged horizontally.

Subsequently, the direction of the axis of rotation is altered, in such a way that the sample is for example rotated about an axis of which the direction extends perpendicular to the first vertical direction. Thus, for example the "polar caps" of the sample, in other words the regions which are usually only poorly resolved by SPIM, can also be recorded at high quality, since they are rotated away from the original (first) axis of rotation, thus for example towards a lens.

By contrast with SPIM, where the first and second light beams are arranged mutually orthogonal, in a conventional transmitted-light microscope the first light beams and the second light beams generally have the same direction. The axis of rotation is thus preferably also an axis which is not parallel to the light beams. Preferably, the first axis of rotation is perpendicular to the light beams. As described above, the second axis of rotation is different from the first axis of rotation. More preferably, the second axis of rotation is perpendicular to the first axis of rotation.

In a further preferred variant, it is advantageous for the movement of the sample also to include a translational component. Preferably, this variant comprises displacing the sample in a direction perpendicular to the longitudinal axis of the lens of the detection means. Thus for example a plurality of samples may be moved in succession past the lens of the detection device and recorded. It is more preferable for these samples for example to be arranged in succession in a guide system or tube and to be moved through it in succession at a predetermined distance from one another. Once all of the relevant regions of a first sample have been recorded, it is moved onwards out of the focal plane in translation by varying the magnetic field, specifically preferably substantially parallel to the direction of the central axis of the tube. It thus clears space for a second sample, which is subsequently moved into the focal plane. Alternatively, fluidics can be used to move the samples over large distances and using the magnetic manipulation to ensure precise positioning and orientation for imaging. By way of this variant, a large number of samples may for example be moved into the focus in succession, and this in particular facilitates high-throughput methods. In this way, a large number of samples can be imaged in a short time.

As regards the device, it is therefore preferred for the imaging device to comprise a guide system which is in a flow connection, at least via one open end, with a reservoir container for a plurality of samples, and for the magnetic field of the device for moving the sample in three dimensions to be variable in such a way that a sample from the reservoir container can be moved into the coverage region of the detection means by the guide system. This can be implemented for example by displacing a magnet along the guide system.

To prevent dispersion of the magnetic elements within the sample, it has been found expedient in practice for the at least one magnetic element to be introduced into the sample for example at a pressure of 0.2 to 0.5 bar, preferably of 0.3 to 0.4 bar and/or over a period of 100 to 200 ms, preferably of 150 ms.

Further, in a preferred embodiment, it is advantageous for the at least one magnetic element to be superparamagnetic and/or to be in the form of a magnetic bead.

The term "magnetic beads" describes small magnetic particles of preferably a substantially spherical shape having a diameter of approximately 20 nm to approximately 10 µm, which are generally known in the art by this name and are used for example for sorting cell mixtures. For example, paramagnetic magnetite ($Fe_3O_4$) is enclosed in a polymer for this purpose. By way of further modifications, the surface of the polymer can subsequently be used as an immobilization surface for example for antibodies. At small crystal sizes below 30 nm, magnetite behaves superparamagnetically; in other words, it can be magnetized itself using a magnetic field, but immediately loses its magnetization again once the magnetic field is removed. To achieve a sufficient response from the sample to a magnetic field applied and/or varied at a predetermined field strength from a predetermined distance from the sample, it has been found to be advantageous to introduce a plurality of magnetic beads into the sample.

If for example selective plane illumination microscopy is used as the imaging method, as described above, it is advantageous for a first direction of the proportion of the first light beams which is incident on the sample and a second direction of the proportion of the second light beams which is incident on the detection device to be at an angle of 80° to 100° to one another, preferably 90°. Advantageously, the regions of the samples are fluorescently labeled at least in part.

It is particularly simple to move the sample if the device for moving the sample in three dimensions comprises at least one electromagnet and/or at least one permanent magnet. Both types of magnets allow the user to control direction and extent of rotation of the probe, e.g. the embryo.

For example, a plurality of magnets may be arranged on one axis or various axes extending through the sample. Using an electromagnet makes it possible to switch the magnetic field on and off as desired. However, a permanent magnet is more cost-effective but would need to be mechanically moved or rotated around the sample.

It is thus advantageous for the magnetic field to be varied by changing the position or current through of the at least one electromagnet and/or the position of at least one permanent magnet. The position of the magnet is thus changed for example by moving it towards or away from the sample. In this context, it is also conceivable to arrange a further magnet positioned opposite the first, in such a way that a magnet is arranged on each of the two sides of the sample. It is also conceivable for the magnet to be moved past the sample, specifically in the direction in which the sample is to be rotated and/or displaced.

In a preferred embodiment of the device, the device for moving the sample in three dimensions comprises at least one magnet, preferably at least two, which can be rotated about at least 2 different axes with respect to the sample. If there are a plurality of magnets, each individual magnet merely has to be rotatable about at least one axis with respect to the sample. What is important for this embodiment is that the device for moving the sample in three dimensions can generate an overall magnetic field of variable direction for moving the sample in three dimensions. This variable overall magnetic field may be the result of a magnet (or more than one magnet), which can be rotated about at least 2 different axes with respect to the sample, or of the sum of individual magnetic fields of a plurality of magnets which can merely be rotated about at least one axis with respect to the sample.

If in a preferred embodiment a plurality of magnets are arranged around the sample, it is appropriate to use electromagnets. By varying the respective flow of current, the magnetic field from each of these electromagnets can be adjusted in such a way that it is possible to orient the sample, preferably even completely, without moving the individual electromagnets. In this case, the sample is moved by varying the magnetic field, resulting from the sum of the individual magnetic fields of the respective electromagnets, of the electromagnetic device, which includes all of the electromagnets arranged around the sample.

An embodiment of the imaging device is therefore preferred in which the device for moving the sample in three dimensions comprises a plurality, preferably at least 3, of electromagnets arranged fixed in position with respect to the device, the respective magnetic fields of which can be set individually, in such a way that the sum of the individual magnetic fields can generate an overall magnetic field of variable strength and direction for moving the sample in three dimensions.

To automate the method further, it is further conceivable to categorize or classify samples by parameters thereof such as size, shape and the position and viscosity of the region in which the magnetic beads are introduced. The advantage is that in this connection a predeterminable program for imaging this sample type can be initiated, which in particular automatically carries out the sequence of changes in the magnetic field (and thus the movements to be made by the sample), the number of and properties of the images to be recorded after the sample is oriented by way of the movement, and the selection of the relevant sample regions. In this way, the time required for recording a sample can be greatly reduced and data more efficiently recorded.

To automate the method further a feedback could be provided by automatic image analysis of the data recorded by the imaging device. By monitoring the state of the (living) sample interesting regions can be identified and the sample automatically rotated for ideal imaging conditions. Further analysis of the recorded data can be used to verify the quality of the data and trigger additional recording (from different directions) when needed.

The recording time can be further reduced if the magnets advantageously can be moved and/or be arranged around the sample in predetermined positions or on predetermined movement paths, which are for example formed annular, by means of actuable drive units. It is further advantageous if the magnets are arranged replaceably, in such a way that for example a stronger or weaker magnetic field can be applied if required.

If there are a large number of unsorted samples, the samples may also be sorted before the actual recording starts. The fact that different antibodies can be arranged on the polymer shell of the magnetic bead, as described above, can be exploited for this purpose. These react with a specific antigen, the presence of which on the sample surface can be used for example as a sorting criterion. The relevant samples to which the magnetic beads bind by means of the antibody-antigen complex can thus be moved using the magnetic field, and thus separated from the remaining samples and subsequently imaged.

The method according to the invention has been found to be advantageous in particular if the sample is a living organism. As described below by way of the drawings, the sample may for example be a living zebrafish or a living zebrafish embryo.

As described below, no negative effects on the development of zebrafish could be found after the magnetic elements were introduced. However, if there is a risk of effects of this type in another living or non-living sample or if the sample is too small or impermeable for injections, it would be conceivable not to introduce the magnetic bead into the sample, but instead to apply it to the sample externally, so as to remove it again after imaging. A further option would be to provide a suitable binding device to which the sample can be bound temporarily for imaging purposes. In this context, "bound" may for example mean "enclosed" or "adhering", without the sample being damaged as a result. One conceivable binding device would be a hollow cylinder which is filled with a physiological fluid and in which the sample is enclosed. Subsequently, the magnetic element is applied to the hollow cylinder, or the magnetic element has already been applied to the hollow cylinder. Ideally, the shape of the binding device and the binding between the binding device and the sample are configured in such a way that the sample cannot move or can barely move relative to the binding device, making controlled movement of the sample possible by moving the binding device.

Further, the object is also achieved by an imaging device for imaging at least one region of a sample, comprising a light source having a radiation region, by means of which a proportion of first light beams can be emitted onto the sample, and a detection means having a coverage region, it being possible to detect a proportion of second light beams emanating from the sample and to record an image of the region of the sample by means of the detection means, it being possible to arrange the region of the sample in the radiation region of the light source and in the detection region of the detection means, and the device further comprising at least one device for moving the sample in three dimensions, and at least one magnetic element, which can be applied to the sample and/or introduced into the interior of the sample, and which can be moved by means of the device for moving the sample in three dimensions, by means of which a variable magnetic field can be applied which can be made to interact with the at least one magnetic element arranged in the sample.

For this purpose, it is further advantageous for the device for moving the sample in three dimensions to comprise at least one electromagnet and/or at least one permanent magnet.

Further, the at least one magnetic element may be superparamagnetic and/or be in the form of a magnetic bead.

Further advantages, aims and properties of the present invention are described by way of the following description of accompanying drawings. Parts of the device, which are shown in the drawings and substantially correspond in function may be denoted by like reference numerals, although these components need not be numbered and illustrated in all of the drawings, in which.

Figure 5:
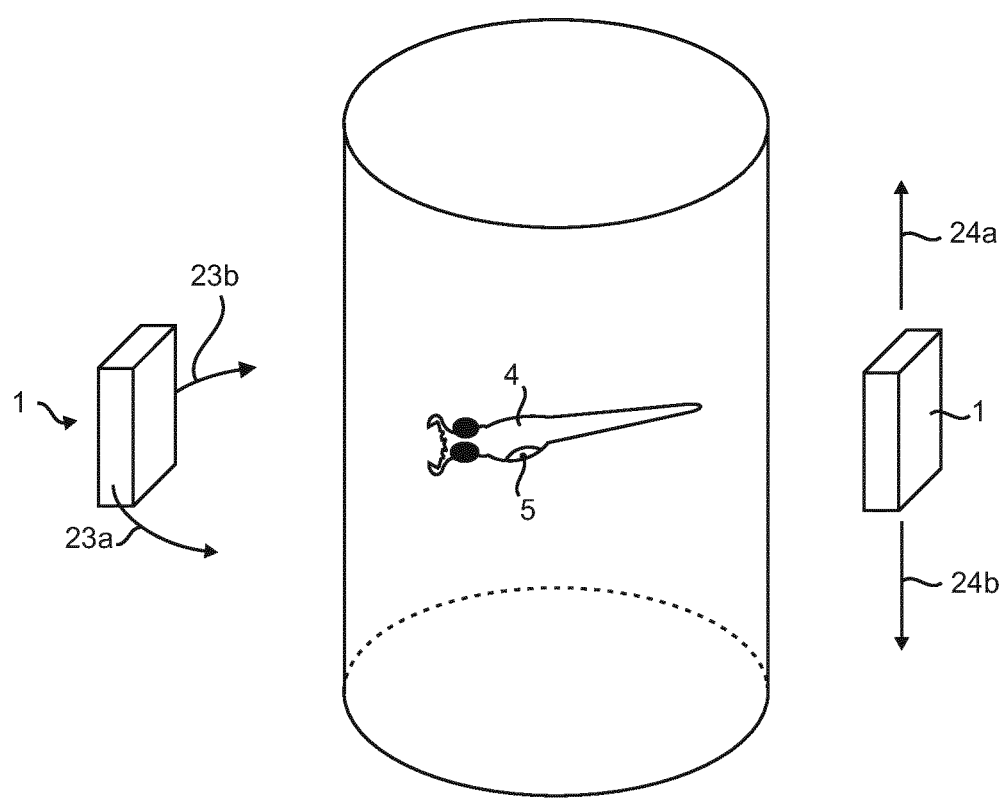

FIG. 5 schematically shows the arrangement of a sample in the form of a zebrafish embryo having an inserted magnetic bead.

Figure 1:
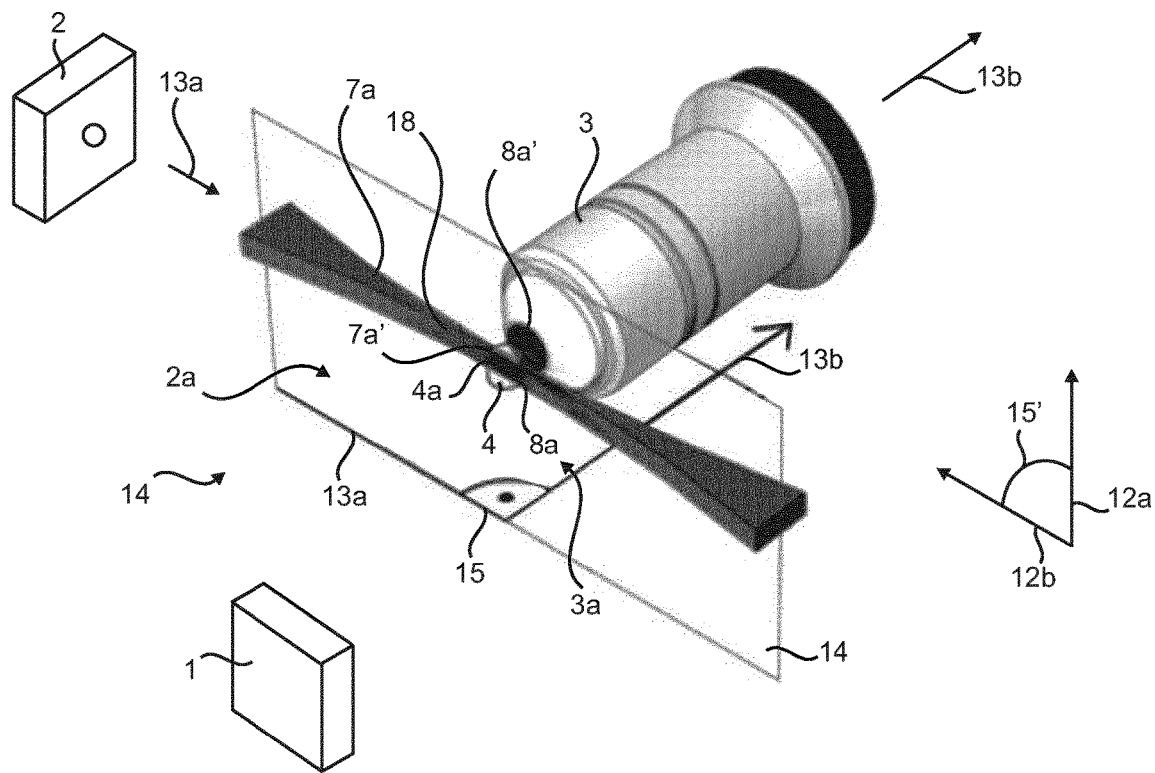
FIG. 1 illustrates the principle of light sheet microscopy.

FIG. 1 illustrates the principle of light sheet microscopy (SPIM). The basic principle of light sheet microscopy—also known as selective plane illumination microscopy (SPIM)—is to illuminate the sample 4 from the side in the focal plane 14 of the detection objective (3). The illumination path 13a and the detection path 13b are distinct and perpendicular 15 to each other. The sample 4 is placed at the intersection of the illumination 13a and the detection axes 13b. In this case, the light source is in the form of a laser, from which first light beams 7a are emitted, a proportion 7a' of these first light beams 7a being in the form of a light sheet 18. The light sheet 18 excites the sample 4 in a thin volume around the focal plane 14 and a part 8a' of the emitted fluorescence 8a is collected by the detection optics 3. Of crucial importance for the performance of the SPIM technology are the properties of the light sheet 18: thickness, uniformity, and its ability to penetrate scattering tissue. A light sheet can be produced in multiple ways.

Rotation about an axis 12a having a first, vertical direction during SPIM is known in the art. FIG. 1 additionally shows a further axis 12b having a second direction, arranged at an angle 15' to the first axis 12a. When the method according to the invention is used with a suitable imaging device 14, there may, as disclosed above, be a rotation about the first axis 12a having the first direction and, in the rest of the method, a rotation about the second axis 12b having the second direction, so as to be able to image all regions of the sample. For this purpose, a magnet 1 is illustrated in FIG. 1.

Light sheet microscopy offers a number of advantages over conventional fluorescence microscopy techniques, in particular multi-color fluorescence imaging, optical sectioning, minimal photo toxicity, fast and sensitive detection with the latest camera technology (EMCCD, sCMOS), good penetration in scattering tissues and multi-view acquisition by rotation of the sample.

Figure 2:
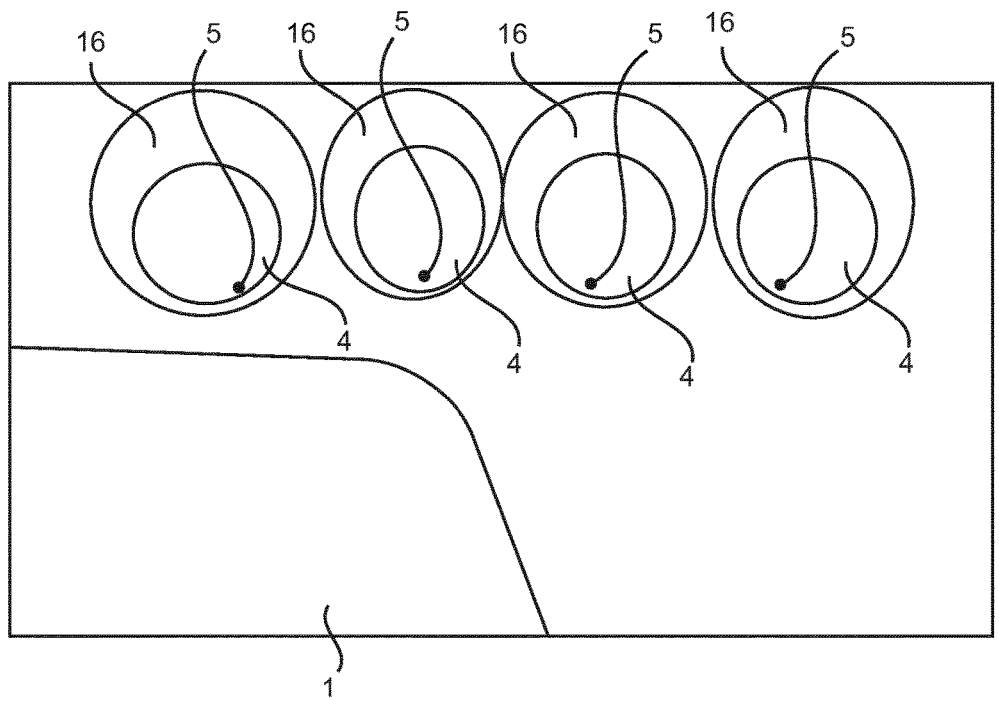
FIG. 2-4 show zebrafish embryos comprising introduced magnetic elements at various times during development.
Figure 3:
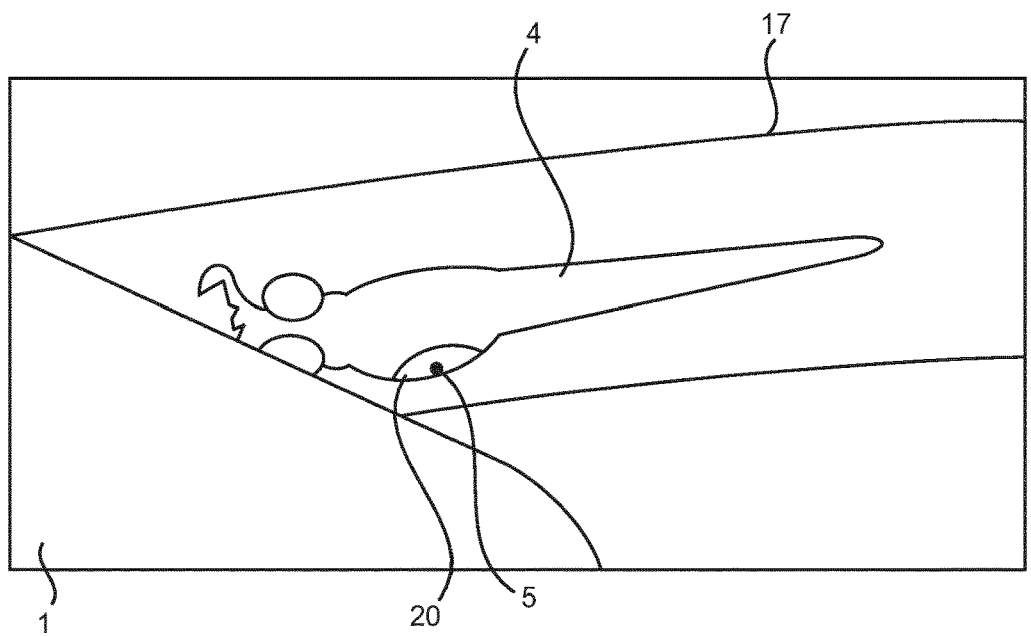
Figure 4:
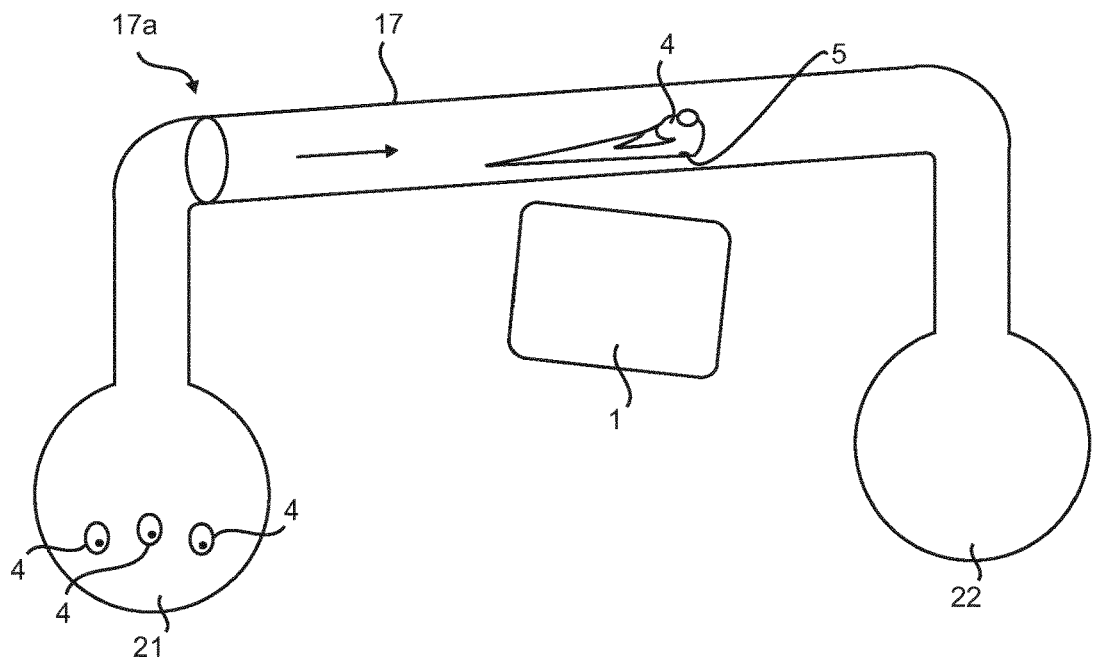

FIG. 2 shows 4 hpf (hpf=hours post fertilization) embryos 4 injected with magnetic beads 5. FIG. 3 and FIG. 4 show the same zebrafish larva 4 at day 3 and 6 of development respectively. The beads 5 are oriented towards the magnet 1 in each image.

Zebrafish embryos until 48 hpf are free to move inside a fluid filled protective covering called chorion 16. As the movement of the embryo is independent of that of the chorion 16, superparamagnetic beads 5 were used to have an external control on the embryo's 4 position and movement. These beads 5 exhibit magnetic properties in the presence of a magnetic field with no residual magnetism once the field is removed. 10 ng of such beads 5 are injected in the yolk of a 4 hpf zebrafish embryo 4, for example. Injections can be performed at any stage though. The injection needle was inserted from either the vegetal pole or the lateral side and beads 5 were deposited close to the yolk membrane on the opposite side. It is important that the beads 5 stay as a clump and close to the yolk membrane to be able to generate sufficient torque to move or turn the large embryo 4. Injections were performed at extremely low pressure (~5 psi, ca. 0.34 bar) and long injection duration (~150 ms) so as to avoid the dispersion of beads 5 in the yolk.

Bringing a permanent magnet 1 close to the embryo 4 activates the magnetic beads 5 and the beads 5 follow the movement of the magnet 1. Moving the permanent magnet 1 causes the embryo 4 to follow the movement of the magnet. As a function of the moment of the magnet 1 it was possible to induce a translation and/or rotation of the embryo 4 inside the chorion 16.

The same can also be achieved by simply moving a magnet 1 along the direction in which the embryo 4 is to be rotated, as visualized by FIGS. 3 and 4. This is a very powerful tool to orient the early zebrafish embryo 4 in the desired orientation to image the sample in its entirety. Embryos 4 injected with beads 5 at 4 hpf were monitored for 7 days with no visible delay or defect in development when compared to non-injected wildtype embryos. As the embryo 4 develops, the yolk is being used up however the beads 5 tend to remain in the yolk, close to the yolk extension. Moreover, these beads 5 can be moved around inside the yolk in order to perform different tasks, for instance, to flip a 3-day old zebrafish larva (FIG. 3).

Here, the embryo 4 was injected with beads 5 at 4 hpf and was allowed to develop until 3 days. It was then transferred to E3 buffer with 200 mg/l tricane for immobilization. The larva along with the buffer was drawn into a fluorinated ethylene propylene (FEP) tube 17 coated with 3% methyl cellulose (FIG. 3). FEP tubes are transparent polymer tubes used for embedding samples for imaging and coating the inside of the tube with a thin layer of methyl cellulose prevents the fish 4 from sticking to the walls of the tube 17. A magnet 1 was then brought close to the FEP tube 17 to activate the magnetic beads 5 and moved such that all the beads 5 travelled from the yolk extension to the tip of the yolk (FIG. 3). This provides enough force for moving the head and the yolk, which is more bulky as compared to the body of the fish 4. By quickly moving the magnet 1 from one side to the other, the fish 4 can be easily rotated or flipped sideways to image from various sides.

In SPIM, the sample is usually mounted in a vertical orientation. However some studies such as measuring brain activity, requires the fish 4 to be mounted horizontally. An easy way of imaging the sample 4 would be to move the sample through the light sheet 18. This can be accomplished by using the magnet 1 to drag the fish 4 back and forth. The buoyancy due to water facilitates the movement of fish 4 and therefore a small amount of beads 5 is sufficient to drag the entire fish 4.

This is demonstrated with a 6-day old fish 4 in a FEP tube 17 (FIG. 4). All the experiments shown here use a permanent magnet 1, however one can also use an electro-magnet or a combination of both to generate moving magnetic fields to accomplish various tasks. The magnetic field is not visualized in the figures. Most often in SPIM, three translational motors and a rotational motor are used to position the sample 4 in space and to rotate it, respectively. This sample manipulation technique using magnetic particles 5 not just adds additional axes of rotation but can in principle replace the motorized stages and be used to freely orient the sample according to the user's need. While this technique was used with SPIM, it can also be easily implemented with other imaging techniques.

In addition, FIG. 4 further shows that the imaging device 14 comprises a guide system 17 (tube), which is in a flow connection, via an open end 17a, with a reservoir container 21 for a large number of samples 4. At the other end there is a further reservoir container 22. The magnetic field of the device 1 for moving the sample 4 in three dimensions is variable in such a way that a sample 4 from the reservoir container 21 can be moved into the coverage region 3a of the detection means 3 by the guide system 17. Subsequently, it exits the coverage region 3a towards the second reservoir container 22.

FIG. 5 schematically shows the arrangement of a sample 4, in the form of a zebrafish embryo having an inserted magnetic bead 5, in a hollow cylindrical vessel. Two magnets 1 are arranged outside the vessel in the radial direction, one of the magnets 1 being able to perform a movement on a circular path concentrically with the peripheral direction of the vessel in the directions 23a, 23b. The other magnet 1 can be displaced upwards 24a and downwards 24b in translation in the vertical direction of the vessel. The magnetic fields of the two magnets 1 thus add to form an overall magnetic field which causes a movement of the sample 4 when varied.

Material and Method
- Superparamagnetic beads: Dynabeads MyOne Carboxylic Acid (Invitrogen)
- Stock solution: 10 mg/ml; injections: 10 ng/nl
- Distilled water
- Permanent magnet/Electro-magnet
- Microinjection needle
- Micro-injector Step 1: Washing the Beads Take 10 µl of the stock bead solution (10 mg/ml) in an Eppendorf tube. Bring a permanent magnet close to the tube to clump the beads and remove the remaining solution using a pipette. Take the magnet away and resuspend the beads in 10 µl of distilled water. Repeat the process twice before injecting into embryo.

Step 2: Microinjection

Injections were performed using a micro-injector and injection needles. The opening of the needle is adjusted such that it is not too small for the beads to come out as well as not too large to damage the embryo. Beads are injected at extremely low pressure (~5 psi) and long injection duration (~150 ms) in order to avoid dispersion of beads in the yolk.

Step 3: Embedding

For coating the inner surface of the FEP tubes with methyl cellulose, 3% methyl cellulose was withdrawn into and infused out of the FEP tube with a syringe. Thereafter the process is repeated with E3 buffer to create a thin layer of methyl cellulose on the inner walls of the tube. Now the fish larva with 200 mg/l Tricane in E3 is sucked into the FEP tube and can be exposed to the magnetic field. Methyl cellulose prevents it from sticking to the tube and allows the fish to move smoothly inside the tube.

DESCRIPTION OF REFERENCE SIGNS

1 Device
2 Light source
2a Radiation region
3 Detection means
3a Coverage region
4 Sample
4a Region
5 Magnetic element
7a, 8a Sets of light beams
7a', 8a' Proportions
12a, 12b Axis
13a, 13b Direction
14 Focal plane
15, 15' Angle
16 Chorion
17 Guide system/tube
17a Open end
18 Light sheet
20 Yolk sac
21 Reservoir container
22 Reservoir container
23a, 23b Direction
24a, 24b Direction

The invention claimed is:

1. A method for imaging regions of a multicellular organism using a light source and an optical detector and at least one external magnet device for moving the multicellular organism in multiple dimensions, comprising the following method steps:
  a) introducing at least one magnetic element to the multicellular organism by attaching the at least one magnetic element to the multicellular organism adapted to allow rotation of the multicellular organism through a fluid by interaction between the at least one magnetic element and an external magnetic field,
  b) placing the multicellular organism into a container containing a supportive fluid allowing free movement of the multicellular organism in contact with and through the supportive fluid;
  c) applying the magnetic field to the multicellular organism using the at least one external magnet device to rotate the multicellular organism in contact with and through the supporting fluid in multiple dimensions, the magnetic field interacting with the at least one magnetic element introduced to the multicellular organism to cause rotation of the multicellular organism through the supportive fluid by force between the at least one magnetic element and the multicellular organism,
  d) orienting the multicellular organism in a radiation region of the light source and in a detection region of the optical detector, wherein the multicellular organism is placed at the intersection of an illumination path and a detection path at a predetermined orientation,
  e) emitting first light beams from the light source along the illumination path onto the multicellular organism,
  f) generating second light beams emitted by the multicellular organism,
  g) recording an image of a region of the multicellular organism by capturing a proportion of the second light beams incident on the optical detector,
  h) rotating the multicellular organism in contact with and through the supportive fluid from the predetermined orientation to a second predetermined orientation at the intersection of an illumination path and a detection path by varying the magnetic field acting on the at least one magnetic element, and
  i) repeating steps e) to h) until a predeterminable number of images of the multicellular organism at the multiple predetermined orientations have been recorded
  wherein the rotation in step h) comprises rotating the multicellular organism about at least two different axes before the predeterminable number of images have been recorded.

2. The method according to claim 1, wherein the at least one magnetic element is introduced into the multicellular organism at a pressure of 0.2 to 0.5 bar, and/or over a period of 100 to 200 ms.

3. The method according to claim 1, wherein the at least one magnetic element is superparamagnetic and/or is in the form of a magnetic bead.

4. The method according to claim 1, wherein a first direction of the proportion of the first light beams which is incident on the multicellular organism and a second direction of the proportion of the second light beams which is incident on the detection device are at an angle of 80° to 100° to one another.

5. The method according to claim 1, wherein the regions of the multicellular organism are fluorescence-marked at least in part.

6. The method according to claim 1, wherein the external magnet device for rotating the multicellular organism in multiple dimensions comprises at least one electromagnet and/or at least one permanent magnet.

7. The method according to claim 6, wherein the magnetic field is varied by changing the position and/or the current through of the at least one electromagnet and/or the position of at least one permanent magnet.

8. The method according to claim 1, wherein the multicellular organism is a living organism.

9. The method according to claim 1 further comprising computationally combining the predeterminable number of images to provide a merged image.

10. The method according to claim 1, wherein a proportion of the first light beams is in the form of a light sheet, wherein the light sheet intersects and excites a thin layer of the multicellular organism extending along a focal plane of the optical detector.

11. The method according to claim 1, wherein the rotation in step g) comprises rotating the multicellular organism about at least a first and second axis of the multicellular organism, wherein the first axis is perpendicular to the illumination path and the detection path and wherein the second axis is distinct from the first axis.

12. An imaging device for imaging at least one region of a multicellular organism, comprising:
- a light source configured to emit a proportion of first light beams onto the multicellular organism,
- a container containing a supportive fluid allowing free movement of the multicellular organism in contact with and through the supportive fluid; and
- a detector configured to detect a proportion of second light beams emanating from the multicellular organism and to record a predeterminable number of images of the at least one region of the multicellular organism at multiple predetermined orientations,
- wherein the multicellular organism is placed into the container containing the supportive fluid and is positionable in a radiation region of the light source and in a detection region of the detector at a predetermined orientation,
- at least one external magnet device for rotating the multicellular organism in multiple dimensions, and
- at least one magnetic element attached to the multicellular organism adapted to allow rotation of the multicellular organism in contact with and through the supportive fluid by interaction between the at least one magnetic element and an external magnetic field,
- wherein the external magnetic field is created by the at least one external magnet device applied to the multicellular organism for rotating the multicellular organism in contact with and through the supportive fluid in multiple dimensions, and interacting with the at least one magnetic element arranged in and/or on the multicellular organism to cause rotation of the multicellular organism in contact with and through the supportive fluid about at least two different axes by force between the at least one magnetic element and the multicellular organism.

13. The imaging device according to claim 12, wherein the at least one external magnet device for rotating the multicellular organism in multiple dimensions comprises at least one electromagnet and/or at least one permanent magnet.

14. The imaging device according to claim 12, wherein the at least one magnetic element is superparamagnetic and/or is in the form of a magnetic bead.

15. The imaging device according to claim 12, wherein the at least one external magnet device for rotating the multicellular organism in multiple dimensions comprises at least one magnet, which can be rotated about at least two different axes with respect to the multicellular organism, each individual magnet merely having to be rotatable about at least one axis with respect to the multicellular organism if there are a plurality of magnets, it being possible for the sum of the individual magnetic fields to generate an overall magnetic field of variable direction for rotating the multicellular organism in at least three dimensions.

16. The imaging device according to claim 12, wherein the at least one external magnet device for rotating the multicellular organism in multiple dimensions comprises a plurality of electromagnets arranged fixed in position with respect to the imaging device, the respective magnetic fields of which can be set individually, it being possible for the sum of the individual magnetic fields to generate an overall magnetic field of variable strength and direction for rotating the multicellular organism in at least three dimensions.

17. The imaging device according to claim 12, wherein the device comprises a guide system which is in a flow connection, at least via one open end, with a reservoir container for a plurality of multicellular organisms, and for the magnetic field of the device for rotating the multicellular organism in multiple dimensions to be variable in such a way that a multicellular organism from the reservoir container can be moved into the coverage region of the detection means by the guide system.

18. The imaging device according to claim 12, wherein the predeterminable number of images are combinable to provide a merged image.

* * * * *